United States Patent [19]
Ng

[11] Patent Number: 6,078,697
[45] Date of Patent: Jun. 20, 2000

[54] METHOD AND APPARATUS FOR SEGMENTING IMAGE DATA INTO CONTONE, TEXT AND HALFTONE CLASSIFICATIONS

[75] Inventor: Yee Seung Ng, Fairport, N.Y.

[73] Assignee: Eastman Kodak Company, Rochester, N.Y.

[21] Appl. No.: 08/724,641

[22] Filed: Oct. 1, 1996

[51] Int. Cl.[7] .................................................. G06K 9/00
[52] U.S. Cl. .......................................... 382/275; 382/228
[58] Field of Search ..................................... 358/456–460, 358/466–467; 382/275, 225, 228

[56] References Cited

U.S. PATENT DOCUMENTS

| | | | |
|---|---|---|---|
| 5,130,821 | 7/1992 | Ng ........................................... | 358/457 |
| 5,359,431 | 10/1994 | Ng ........................................... | 358/457 |
| 5,471,543 | 11/1995 | Ng et al. .................................. | 382/173 |
| 5,502,793 | 3/1996 | Mg ........................................... | 395/109 |
| 5,745,601 | 4/1998 | Lee et al. ................................. | 382/228 |
| 5,751,862 | 5/1998 | Williams et al. ........................ | 382/260 |

OTHER PUBLICATIONS

U.S. Ser. No. 706,953, Gray Level Printing Method With Embedded Non–Uniformity Correction Using a Multi–bit LED Printhead, *Imaging Science & Technology's 47th Annual Conference/ICPS* 1994, pp. 622–625.

*Primary Examiner*—Thomas D. Lee
*Assistant Examiner*—Stephen Brinich
*Attorney, Agent, or Firm*—Norman Rushefsky

[57] ABSTRACT

A method and apparatus are disclosed for processing image information for identifying an image type of a current pixel for rendering the current pixel in accordance with a rendering operation suited for the identified type. Each current pixel is examined in accordance with first predetermined criteria. In response to this examination, for each of plural image types, there is generated a signal representing a probability related value that the current pixel is of that image type. Based on probability related values, the image type of the current pixel is determined. However, for some current pixels a first signal is generated representing a preliminary evaluation that the image type is indeterminate relative to assignment to one of plural respective image types. There is then provided an evaluation for the indeterminate current pixel in accordance with second predetermined criteria. In response to such an evaluation there may be generated a second signal representing assignment of the indeterminate current pixel to one of the plural respective image types. For certain current pixels not able to be assigned to a respective image type, there may be provided a rendering process for rendering such pixels differently from pxiels rendered in accordance with an identified image type.

24 Claims, 7 Drawing Sheets

CURRENT PIXEL

LEVEL = 1
17  15  11  13
 6   2   4   8
11  13  17  15
 4   8   6   2

LEVEL = 2
34  32  28  30
23  19  21  25
28  30  34  32
21  25  23  19

LEVEL = 3
51  49  45  47
40  36  38  42
45  47  51  49
38  42  40  36

LEVEL = 4
68  66  61  64
57  53  55  59
61  64  68  66
55  59  57  53

LEVEL = 5
85  83  78  81
74  70  72  76
78  81  85  83
72  76  74  70

LEVEL = 6
102 100  95  98
 91  87  89  93
 95  98 102 100
 89  93  91  87

LEVEL = 7
119 117 112 114
108 104 106 110
112 114 119 117
106 110 108 104

LEVEL = 8
136 134 129 131
125 121 123 127
129 131 136 134
123 127 125 121

LEVEL = 9
153 151 146 148
142 138 140 144
146 148 153 151
140 144 142 138

LEVEL = 10
170 167 163 165
159 155 157 161
163 165 170 167
157 161 159 155

LEVEL = 11
187 184 180 182
176 172 174 178
180 182 187 184
174 178 176 172

LEVEL = 12
204 201 197 199
193 189 191 195
197 199 204 201
191 195 193 189

LEVEL = 13
220 218 214 216
210 206 208 212
214 216 220 218
208 212 210 206

LEVEL = 14
237 235 231 233
227 223 225 229
231 233 237 235
225 229 227 223

LEVEL = 15
253 252 248 250
244 240 242 246
248 250 253 252
242 246 244 240

FIG. 6

```
                    LEVEL = 1                                              LEVEL = 4
153 110 144 135  79 126  48  33  95 235  64   1    17 157 114 148 139  83 130  52  36  99  99 239   5  21
 95 235  64   1  17 110 110 144 135  79 126  48  33    99 239  68   5  21 157 114 148 139  83 130  52  36
135  79 126  48  33  95 235  64   1  17 153 110 144   139  83 130  52  36  99 239  68   5  21 157 114 148
  1  17 153 110 144 135  79 126  48  33  95 235  64     5  21 157 114 148 139  83 130  52  36  99 239  68
 48  33  95 235  64   1  17 153 110 144 135  79 126    52  36  99 239  68   5  21 157 114 148 139  83 130
110 144 135  79 126  48  33  95 235  64   1  17 153   114 148 139  83 130  52  36  99 239  68   5  21 157
235  64   1  17 153 110 144 135  79 126  48  33  95   239  68   5  21 157 114 148 139  83 130  52  36  99
 79 126  48  33  95 235  64   1  17 153 110 144 135    83 130  52  36  99 239  68   5  21 157 114 148 139
 17 153 110 144 135  79 126  48  33  95 235  64   1    21 157 114 148 139  83 130  52  36  99 239  68   5
 33  95 235  64   1  17 153 110 144 135  79 126  48    36  99 239  68   5  21 157 114 148 139  83 130  52
144 135  79 126  48  33  95 235  64   1  17 153 110   148 139  83 130  52  36  99 239  68   5  21 157 114
 64   1  17 153 110 144 135  79 126  48  33  95 235    68   5 157 157 114 148  83  83 130  52  36  99 239
126  48  33  95 235  64   1  17 153 110 144 135  79   130  52  36  99 239  68   5  21 157 114 148 139  83

LEVEL = 2                                              LEVEL = 5
155 112 146 137  81 127  49  34  96 237  65   3  18   159 116 150 140  85 131  53  38 100 240  69   7  22
 96 237  65   3  18 155 112 146 137  81 127  49  34   100 240  69   7  22 159 116 150 140  85 131  53  38
137  81 127  49  34  96 237  65   3  18 155 112 146   140  85 131  53  38 100 240  69   7  22 159 116 150
  3  18 155 112 146 137  81 127  49  34  96 237  65     7  22 159 116 150 140  85  85  53  38 100 240  69
 49  34  96 237  65   3  18 155 112 146 137  81 127    53  38 100 240  69   7  22 159 116 150 140  85 131
112 146 137  81 127  49  34  96 237  65   3  18 155   116 150 140  85 131  53  38 100 240  69   7  22 159
237  65   3  18 155 112 146 137  81 127  49  34  96   240  69   7  22 159 116 150 140  85 131  53  38 100
 81 127  49  34  96 237  65   3  18 155 112 146 137    85 131  53  38 100 240  69   7  22 159 116 150 140
 18 155 112 146 137  81 127  49  34  96 237  65   3    22 159 116 150 140  85 131  53  38 100 100 240   7
 34  96 237  65   3  18 155 112 146 137  81 127  49    38 100 240  69   7  22 159 116 150 140  85 131  53
146 137  81 127  49  34  96 237  65   3  18 155 112   150 140  85 131  53  38 100 240  69   7  22 159 116
 65   3  18 155 112 146 137  81 127  49  34  96 237    69   7  22 159 116 150 140  85 131  53  38 100 240
127  49  34  96 237  65   3  18 155 112 146 137  81   131  53  38 100 240  69   7  22 159 116 150 140  85

LEVEL = 3                                              LEVEL = 6
156 113 147 138  82 129  51  35  98 238  66   4  20   160 117 151 142  86 133  55  39 101 242  70   8  23
 98 238  66   4  20 156 113 147 138  82 129  51  35   101 242  70   8  23 160 117 151 142  86 133  55  39
138  82 129  51  35  98 238  66   4  20 156 113 147   142  86 133  55  39 101 242  70   8  23 160 117 151
  4 156 113 113 147 138  82 129  51  35  98 238  66     8  23 160 117 151 142  86 133  55  39 101 242  70
 51  98 238 238  66   4  20 156 113 147 138  82 129    55  39 101 242  70   8  23 160 117 151 142  86 133
113 147 138  82 129  51  35  98 238  66   4  20 156   117 151 142  86  86  55  39 101 242  70   8  23 160
238  66   4  20 156 113 147 138  82 129  51  35  98   242  70   8  23 160 117 151 142  86 133  55  39 101
 82 129  51  35  98 238  66   4  20 156 113 147 138    86 133  55  39 101 242  70   8  23 160 117 151 142
 20 156 113 147 138  82 129  51  35  98 238  66   4    23 160 117 151 142  86 133  55  39 101 242  70   8
 35  98 238  66   4  20 156 113 147 138  82 129  51    39 101 242  70   8  23 160 117 151 142  86 133  55
147 138  82 129  51  35  98 238  66   4  20 156 113   151 142  86 133  55  39 101 242  70   8  23 160 117
 66   4  20 156 113 147 138  82 129  51  35  98 238    70   8  23 160 117 151 142  86 133  55  39 101 242
129  51  35  98 238  66   4  20 156 113 147 138  82   133  55  39 101 242  70   8  23 160 117 151 142  86
```

FIG. 7A

```
              LEVEL = 7                                    LEVEL = 10
178 118 173 168  87 163  56  40 103 243  72   9  25    195 122 191 187  91 183  60  44 107 247  75  13  29
103 243  72   9  25 178 118 173 168  87 163  56  40    107 247  75  13  29 195 122 191 187  91 183  60  44
168  87 163  56  40 103 243  72   9  25 178 118 173    187  91 183  60  44 107 247  75  13  29 195 122 191
  9  25 178 118 173 168  87 163  56  40 103 243  72     13  29 195 122 191 187  91 183  60  44 107 247  75
 56  40 103 243  72   9  25 178 118 173 168  87 163     60  44 107 247  75  13  29 195 122 191 187  91 183
118 173 168  87 163  56  40 103 243  72   9  25 178    122 191 187  91 183  60  44 107 247  75  13  29 195
243  72   9  25 178 118 173 168  87 163  56  40 103    247  75  13  29 195 122 191 187  91 183  60  44 107
 87 163  56  40 103 243  72   9  25 178 118 173 168     91 183  60  44 107 247  75  13  29 195 122 191 187
 25 178 118 173 168  87 163  56  40 103 103  72   9     29 195 122 191 187  91 183  60  44 107 247  75  13
 40 103 243  72   9  25 178 118 173 168  87 163  56     44 107 247  75  13  29 195 122 191 187  91 183  60
173 168  87 163  56  40 103 243  72   9  25 178 118    191 187  91 183  60  44 107 247  75  13  29 195 122
 72  25  25 178 118 173 168  87 163  56  40 103 243     75  13  29 195 122 191 187  91 183  60  44 107 247
163  56  40 103 243  72   9  25 178 118 173 168  87    183  60  44 107 247  75  13  29 195 122 191 187  91

LEVEL = 8                                    LEVEL = 11
179 120 174 169  88 164  57  42 104 244  73  10  26    196 123 192 189  92 185  61  46 108 248  77  14  30
104 244  73  10  26 179 120 174 169  88 164  57  42    108 248  77  14  30 196 123 192 189  92 185  61  46
169  88 164  57  42 104 244  73  10  26 179 120 174    189  92 185  61  46 108 248  77  14  30 196 123 192
 10  26 179 120 174 169  88 164  57  42 104 244  73     14  30 196 123 192 189  92 185  61  46 108 248  75
 57  42 104 244  73  10  26 179 120 174 169  88 164     61  46 108 248  77  14  30 196 123 192 189  92 185
120 174 169  88 164  57  42 104 244  73  10  26 179    123 192 189  92 185  61  46 108 248  77  14  30 196
244  73  10  26 179 120 174 169  88 164  57  42 104    248  77  14  30 196 123 192 189  92 185  61  46 108
 88 164  57  42 104 244  73  10  26 179 120 174 169     92 185  61  46 108 248  77  14  30 196 123 192 189
 26 179 120 174 169  88 164  57  42 104 104  73  10     30 196 123 192 189  92 185  61  46 108 248  77  14
 42 104 244  73  10  26 179 120 174 169  88 164  57     46 108 248  77  14  30 196 123 192 189  92 185  61
174 169  88 164  57  42 104 244  73  10  26 179 120    192 189  92 185  61  46 108 248  77  14  30 196 123
 73  26  26 179 120 174 169  88 164  57  42 104 244     77  14  30 196 123 192 189  92 185  61  46 108 248
164  57  42 104 244  73  10  26 179 120 174 169  88    185  61  46 108 248  77  14  30 196 123 192 189  92

LEVEL = 9                                    LEVEL = 12
181 121 176 170  90 165  58  43 105 246  74  12  27    207 125 204 202  94 199  62  47 109 250  78  16  31
105 246  74  12  27 181 121 176 170  90 165  58  43    109 250  78  16  31 207 125 204 202  94 199  62  47
170  90 199  58  43 105 246  74  12  27 181 121 176    202  94 199  62  47 109 250  78  16  31 207 125 204
 12  27 207 121 176 170  90 165  58  43 105 246  74     16  31 207 125 204 202  94 199  62  47 109 250  78
 58  43 109 246  74  12  27 181 121 176 170  90 165     62  47 109 250  78  16  31 207 125 204 202  94 199
121 176 202  90 165  58  43 105 246  74  12  27 181    125 204 202  94 199  62  47 109 250  78  16  31 207
246  74  16  27 181 121 176 170  90 165  58  43 105    250  78  16  31 207 125 204 202  94 199  62  47 109
 90 165  62  43 105 246  74  12  27 181 121 176 170     94 199  62  47 109 250  78  16  31 207 125 204 202
 27 181 125 176 170  90 165  58  43 105 246  74  12     31 207 125 204 202  94 199  62  47 109 250  78  16
 43 105 250  74  12  27 181 121 176 170  90 165  58     47 109 250  78  16  31 207 125 204 202  94 199  62
176 170  94 165  58  43 105 246  74  12  27 181 121    204 202  94 199  62  47 109 250  78  16  31 207 125
 74  12  31 181 121 176 170  90 165  58  43 105 246     78  16  31 207 125 204 202  94 199  62  47 109 250
165  58  47 105 246  74  12  27 181 121 176 170  90    199  62  47 109 250  78  16  31 207 125 204 202  94
```

FIG. 7B

LEVEL = 13

218 182 216 213 172 211 161 152 177 251 166 134 143
177 251 166 134 143 218 182 216 213 172 211 161 152
213 172 211 161 152 177 251 166 134 143 218 182 216
134 143 218 182 216 213 172 211 161 152 177 251 166
161 152 177 251 166 134 143 218 182 216 213 172 211
182 216 213 172 211 161 152 177 251 166 134 143 218
251 166 134 143 218 182 216 213 172 211 161 152 177
172 211 161 152 177 251 166 134 143 218 182 216 213
143 218 182 216 213 172 211 161 152 177 251 166 134
152 177 251 166 134 143 218 182 216 213 172 211 161
216 213 172 211 161 152 177 251 166 134 143 218 182
166 134 143 218 182 216 213 172 211 161 152 177 251
211 161 152 177 251 166 134 143 218 182 216 213 172

LEVEL = 14

229 208 226 224 203 221 198 194 205 252 200 186 190
205 252 200 186 190 229 208 226 224 203 221 198 194
224 203 221 198 194 205 252 200 186 190 229 208 226
186 190 229 208 226 224 203 221 198 194 205 252 200
198 194 205 252 200 186 190 229 208 226 224 203 221
208 226 224 203 221 198 194 205 252 200 186 190 229
252 200 186 190 229 208 226 224 203 221 198 194 205
203 221 198 194 205 252 200 186 190 229 208 226 224
190 229 208 226 224 203 221 198 194 205 252 200 186
194 205 252 200 186 190 229 208 226 224 203 221 198
226 224 203 221 198 194 205 252 200 186 190 229 208
200 186 190 229 208 226 224 203 221 198 194 205 252
221 198 194 205 252 200 186 190 229 208 226 224 203

LEVEL = 15

METHOD AND APPARATUS FOR SEGMENTING IMAGE DATA INTO CONTONE, TEXT AND HALFTONE CLASSIFICATIONS

BACKGROUND OF THE INVENTION

1. Field of the Invention

This invention relates generally to method and apparatus for processing of image data of documents or other type images wherein the image data may represent different types of images.

2. Description Relative to the Prior Art

In the use of digital copier/printers, when a document with different image types (continuous tone photographs, halftone pictures, text (gray, as well as binary)) and graphics) are used with one set of output printing algorithm at one time (error diffusion, gray level halftone screening or thresholding etc.), there can be some undesirable effects occurring. For example, if an input halftone picture is printed with a lower screen frequency halftone output (like a hard dot 150 lines/inch screen) moiré pattern shows up. If a text image is printed with a halftone output, the text quality (especially gray text and smaller font size text as well) degrades due to the screening. If a more continuous tone like output algorithm (like gray level error diffusion or a partial dot higher screen gray level halftone) is used, then the granularity of the continuous tone input image suffers. Sometimes those different image types can even exist on the same page. One known solution to this problem is to provide the copier/printer or other output display device such as a CRT, etc. with a manual selection device so that the customer (either through an on-screen editing function or by use of digitizing table the operator can identify various image types on the page before processing). However, this is very tedious and is not efficient to do in a walkup environment. So it is desirable to be able to segment the input image type in real time so a more appropriate output rendering algorithm can be used for each image type.

It is also known in the prior art as exemplified by commonly assigned U.S. Pat. No. 5,471,543 to provide for automatic image type processing wherein regions of a document are determined as to image type and these determinations are based on certain criteria. These regions then are processed in accordance with such determinations. A problem associated with this region building approach is that the process of assigning pixels to regions and then building regions is relatively slow and requires that the processor buffer substantial areas of the document page during the region building process.

It is therefore an object of this invention to overcome the problems associated with the prior art automatic segmentation of image data which does not require substantial buffering of image data by the processor nor requires substantial processing time for region building determinations.

SUMMARY OF THE INVENTION

In accordance with a first aspect of the invention, there is provided a method for processing image information for identifying an image type of a current pixel for rendering the current pixel in accordance with a rendering operation suited for the identified type, the method comprising generating for each of plural image types a signal representing a probability related value that the current pixel is of that image type; based on probability related values, determining the image type of the current pixel; and rendering the current pixel in accordance with rendering for one image type based on a likelihood that the current pixel is more characteristic of the one image type.

In accordance with a second aspect of the invention there is provided a method for processing image information for identifying an image type of a current pixel for rendering the current pixel in accordance with a rendering operation suited for the identified type, the method comprising examining at least some current pixels in an image in accordance with first predetermined criteria and generating first signals representing preliminary evaluations that the image types for rendering said pixel are indeterminate relative to assignment of each to one of plural respective image types; providing an evaluation for an indeterminate current pixel in accordance with second predetermined criteria and generating a second signal representing assignment of the indeterminate current pixel to one of the plural respective image types; and rendering the current pixel in accordance with the selected image type.

In accordance with a third aspect of the invention there is provided an apparatus for processing image information for identifying an image type of a current pixel for rendering the current pixel in accordance with a rendering operation suited for the identified type, the apparatus comprising means for generating for each of plural image types a signal representing a probability related value that the current pixel is of that image type; means responsive to signals representing probability related values for determining the image type of the current pixel; and means for rendering the current pixel in accordance with rendering for one image type based on a likelihood that the current pixel is more characteristic of the one image type.

BRIEF DESCRIPTION OF THE DRAWINGS

In the detailed description of the preferred embodiment of the invention presented below, reference is made to the accompanying drawings, in which:

FIG. 6 illustrates an example of a 161 lines per inch thresholding matrix set of the type suited for rendering using the apparatus of FIG. 1; and FIGS. 7A, B and C illustrate an example of a 300 lines per inch partial dot threshold matrix set of the type suited for rendering using the apparatus of FIG. 1.

DESCRIPTION OF THE PREFERRED EMBODIMENT

Figure 1:
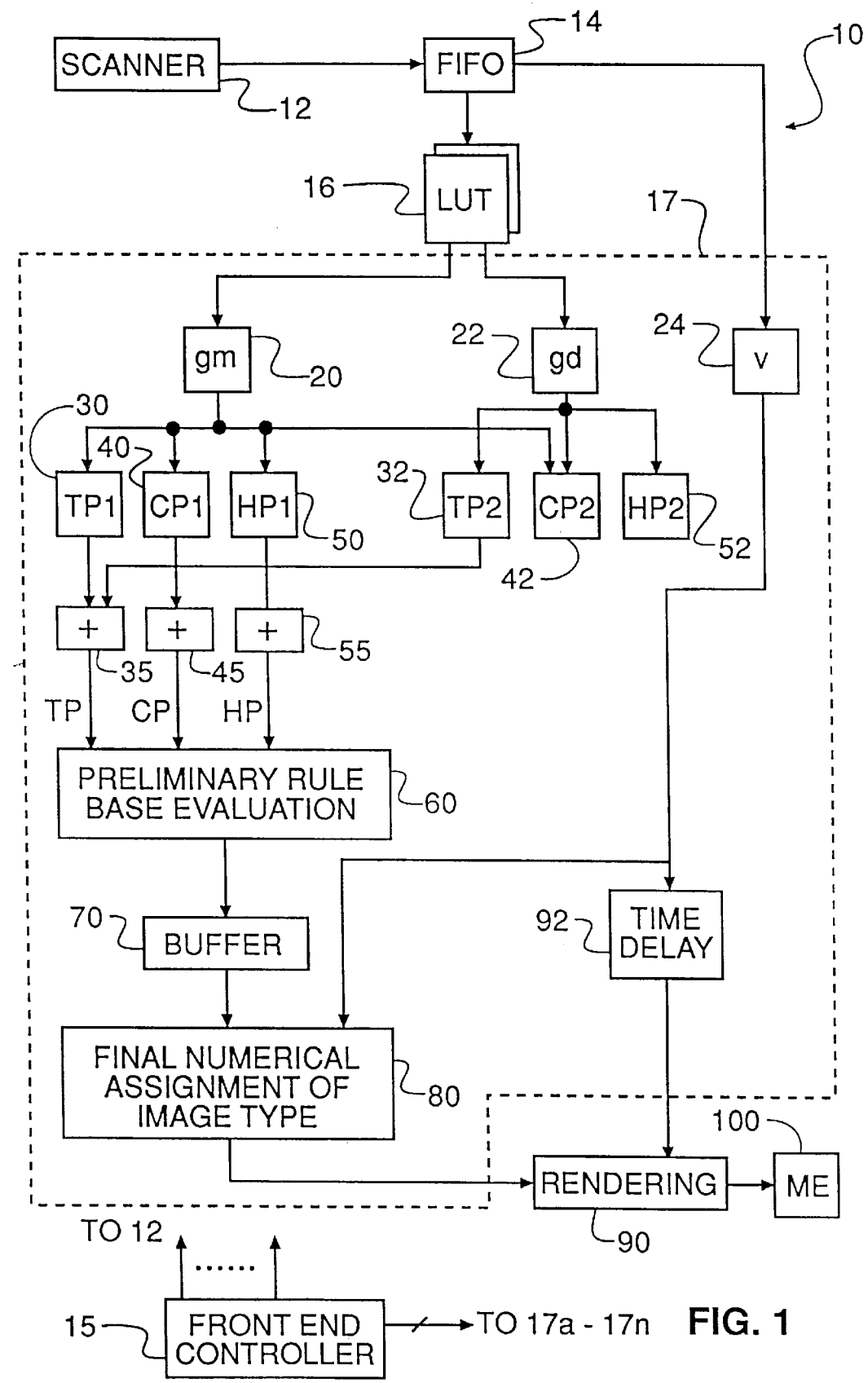
FIG. 1 illustrates a block diagram of an image processing apparatus in accordance with the invention.

The present description will be directed in particular to elements forming part of or cooperation more directly with, apparatus in accordance with the present invention. It is to be understood that elements not specifically shown or described may take various forms well known to those skilled in the art.

With reference to the accompanying drawings a document reproduction apparatus 10 such as an electronic copier includes a digital image scanner that scans a document say on a line-by-line basis or on an area basis. Typically and as an example the scanner 12 may see each line of the document at a resolution of say 1/600 th of an inch in each direction of the document. The document which term implies a document page, may in include thereon various image types such as contone (photograph or continuous tone image), text, halftone, etc. As noted above, reproduction of this document by the copier should be made using image processing techniques more suited to each respective type image. There is thus provided a need to identify an image type for each pixel and reproduce same accordingly. The description herein will assume the image content is of one color, however the invention is useful for processing multicolor images such as for example by separate processing of the image data for each color.

In conjunction with the digital scanner 12, there may be provided correction for correcting for known factors associated with such scanners and this type of preliminary correction is well known in the literature. A preferred scanner may take the form of a series of CCD or photo diode elements arranged in a row that provide an 8 bits per pixel digital value representing density or alternatively lightness of the pixel on a scale of decimal 0 to 255. Thus the data input to the image processing system from the scanner contains digital values which represent gray level rasterized pixel data. It will be understood, of course, that the pixel data may be input from a source other than a scanner such as a computer, work station, electronic camera or other source of electronic information.

Image data output by the scanner or other front-end input device is buffered in a nine-line buffer 14 such as a first-in first-out (FIFO) buffer. In such a buffer eight lines of image data are stored and the ninth line may be the current line input from the scanner. A 9×9 window of image data may be connected from the buffer 14 as inputs to one or more look-up tables 16 (LUTs) that determine respectively a gradient amplitude or magnitude value (gm) and a gradient direction value (gd) for a current pixel being processed. As this process is done sequentially, there are stored in a buffer 20 gradient amplitude values of the current pixel and the eight surrounding pixels thereto, and in a buffer 22 there are stored gradient direction values of the current pixel and the 14 neighboring pixels (3×5 matrix). A separate buffer 24 may also be provided for storing the 8 bits per pixel 9×9 window of image data values (v) so that subsequent processing of pixels may continue while the relationship of the current pixel's image data and that of its neighbors may be retained in the buffer 24. The values of gradient magnitude and gradient direction may be determined and stored in LUTs 16 using operators such as sobel x, sobel y as described in U.S. Pat. No. 5,502,793 and commonly assigned application Ser. No. 08/706,953, filed Sep. 3, 1996 in the names of Yee S. Ng, Glenn R. Van Lare, Richard T. Fischer and entitled "Resolution Enhancement System for Digital Images", the pertinent contents of which are incorporated by reference. Other operators may also be used. In lieu of LUTs the values of gradient magnitude (gm), gradient direction (gd) may be calculated by dedicated calculating circuits or a suitably programmed computer.

The values gm, gd and v stored in buffers 20, 22, 24 are then examined in accordance with a membership function determination operation.

In accordance with the invention the membership function determination of image type e.g. contone, text, halftone is based on an initial probability assessment of image type. As an example of this membership function determination operation consider the case of an image data input of text information such as text characters. Usually when the gradient magnitude (gm) of the current pixel is low, the probability (TP1) of being text is relatively low. Conversely when the gradient magnitude is high, the probability of the current pixel being text is higher.

Table 1 provides a probability related value, TP1 of a current pixel, being text based on particular values of gradient magnitudes for the current pixel. The gradient magnitude of the current pixel is referred to herein as gm [5] since the current pixel is deemed to be located as the fifth pixel of the 3×3 matrix stored in buffer 20. In Table 1, the values a, b, c, d are indicated and may be used as general statement values. In a particular apparatus; i.e, a particular scanning input device with a certain sharpness characteristic, the values a, b, c, and d might be 7, 16, 5 and 45, respectively. The values a, b, c and d may be chosen based on experiments with certain starting assumptions such as that b>a, etc.

TABLE 1

| Test Condition Weighting Order (1 is highest) | TP1 | gm[5] |
|---|---|---|
| 1 | 2 | $gm[5] < c$ and $\left(\sum_{n=1}^{9} gm[n] > d\right)$ |
| 2 | 0 | <a |
| 3 | 1 | >b |
| 4 | (gm[5] − a)/(b − a) | $a \leq gm[5] \leq b$ |

Thus, in accordance with Table 1, the probability related value of the current pixel being text using just a gradient magnitude value (gm) criterion is 0 for a current pixel having a gradient magnitude of less than or equal to "a". If the current pixel's gm is greater than or equal to "b", it is a higher probability (100% or 1) that the current pixel is text. For values of gm [5] between "a" and "b" inclusive the probability related value TP1 is calculated by subtracting "a" from gm [5] and dividing this difference value by (b−a). An exception to the above is the assignment of a probability TP1=2 if gm [5] is less than "c" but the sum of the gradient magnitude values in the buffered 3×3 matrix (or generally n members of the matrix) of gradient values stored in buffer 20 is greater than "d". If this condition is true, it is controlling and there is a high probability that the current pixel is text-based.

Figure 2:
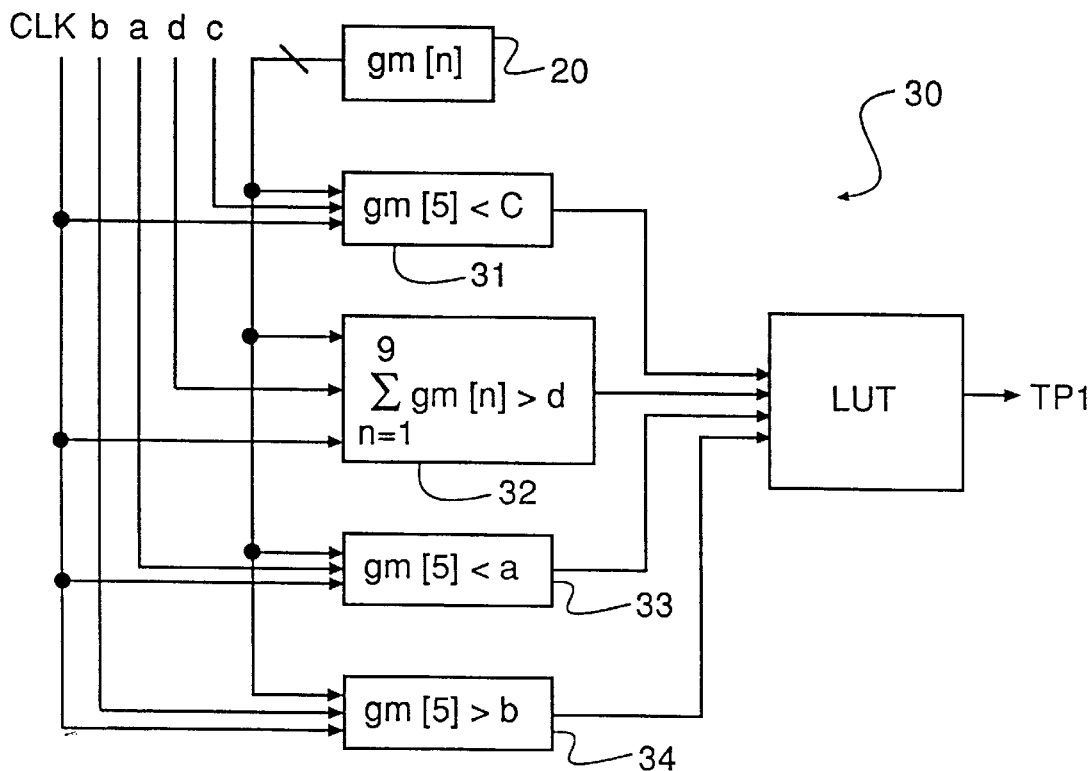
FIG. 2 is a block diagram of a portion of the apparatus of FIG. 1.

Table 1 also shows a test condition weighting order. As may be seen in FIG. 2, the logic condition tests of Table 1 may be implemented, for example, in an application specific integrated circuit (ASIC) by simultaneously testing the various test conditions in logic circuits 31–34, but providing a weighting order to each test so that if two or more of the test conditions are true, the one with the highest weighting order prevails. This weighting order bias is provided by the ordering of the data in the various addresses in the look-up table (LUT) which output a respective probability-related value TP1 in response to an address based on the results of the tests. The address input reflects the results of each of the various logic tests associated with Table 1 with the location of input to the LUT defining the address and these logic tests are done simultaneously in one or a few clock cycles as controlled by clock (CLK) signal inputs from a front-end controller 15 with the results output simultaneously as an address input to the LUT. The weighting order of the data in the LUT is such that if the conditions are, for example, that the outputs of test condition #1 are both true, i.e, logic decisions blocks 31, 32 are both true, then the output of the LUT is TP1=2 or 200% regardless of whether other test conditions shown are also true. This value for this condition is made higher than 100% because it is considered a near certainty that if the current pixel meets this particular condition, then the current pixel should be considered text based. The logic calculations illustrated in the remaining tables may also have processing done in the manner described for TP1.

Figure 4:
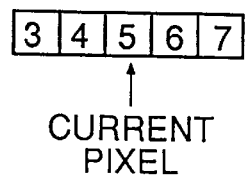
FIG. 4 illustrates a relationship of pixels relative to a current pixel after a rotation operation.

The membership function determination operation (MFDO) also examines each current pixels text probability (TP2) with respect to gradient direction (gd) values. In examining values of gradient direction these values may be examined after a rotation operation as explained in aforementioned U.S. Pat. No. 5,502,793. In Table 2, it may be seen that in determining TP2, the gradient direction value for the current pixel, gd [5], stored in buffer 22 is compared with gradient direction values of adjacent pixels, after rotation, such as gd [4], gd[7], gd[3] which are aligned in the line direction after image rotation as shown in FIG. 4.

TABLE 2

| Test Condition Weighting Order (1 is Highest) | TP2 | gd [5] |
|---|---|---|
| 1 | 1 | gd[5] = gd[6] = gd[4] = gd[7] = gd[3] and gd[5] ≠ 0 |
| 2 | 0.5 | gd[5] = gd[6] = gd[4] and gd[5] ≠ 0 and {gd[5] = gd[3] or gd[5] = gd[7]} |
| 3 | 0.25 | gd[5] = gd[6] = gd[4] and gd[5] ≠ 0 |
| 4 | 0 | none of the above occurs |

The TP1 and TP2 evaluations made in blocks 30, 32, respectively, which may be output by tables or computer calculations or programmed logic circuits represent fuzzy-data probability valuations of the likelihood the current pixel is one derived from a text input. The processing apparatus also examines the current pixel for its probability of being derived from a halftone content (HP1 and HP2) and continuous tone (contone) content (CP1 and CP2).

In considering the MFDO contone fuzzy-data probability values CP1 and CP2, if the gradient magnitude (gm) for the current pixel is high, the probability that it is of contone origin is less (except in a sharp transition situation which will be discussed below) thus reference may be made to Table 3 where probabilities (CP1) that the current pixel is of contone origin are provided when considering the gradient magnitude of the current pixel gm [5] and the surrounding pixels thereto. In Table 3, exemplary values for e, f and g may for a particular scanner device be 9, 5 and 45, respectively.

TABLE 3

| Test Condition Weighting Order (C1 is highest) | CP1 | gm[5] |
|---|---|---|
| 1 | 0 | >e |
| 2 | 1 | $< f$ and $\left( \sum_{n=1}^{9} gm[n] < g \right)$ |
| 3 | 1 − (gm[5]/e) | for all other cases |

The MFDO contone fuzzy-data probability valuations CP2 are based on the fact that if the gradient direction of the current pixel is not changing and its gradient magnitude is small, there is a high probability that the current pixel is contone, thus Table 4 provides a relationship between probability that the current pixel is of contone origin (CP2) using gradient direction values for the current pixel or gd [5].

TABLE 4

| Test Condition Weighting Order (1 is Highest) | CP 2 | gd[5] |
|---|---|---|
| 1 | 1 | 0 and gm [5] = 0 |
| 2 | M/14 | all other cases |

In Table 4, M is the number of neighboring pixels to the current pixel (gd[5]) in the 3×5 gradient direction matrix 22 that have a gradient direction (gd)=0. Thus, for each neighboring pixel of the current pixel and which neighboring pixel has a gradient direction of zero there is added 1/14 points and CP2 equals the sum of those points in the all other cases condition.

The MFDO fuzzy data probability valuations CP1, CP2 for contone membership function content are determined in blocks 40, 42 respectively.

MFDO fuzzy data probability valuations are also made for a halftone membership function content. For the halftone membership function, one makes use of the fact that the gradient magnitudes (gm) are changing and usually tend to be higher values and the gradient directions are usually changing. Thus, the halftone MFDO fuzzy data probability values for the current pixel using magnitude criteria, HP1, and probability values using gradient direction criteria, HP2, are provided in the Tables 5 and 6, respectively. In Table 5, exemplary values of h and i for a particular scanning device may be 12 and 3, respectively.

TABLE 5

| Test Condition Weighting Order (1 is highest) | HP 1 | gm[5] |
|---|---|---|
| 1 | 1 | >h |
| 2 | 0 | <i |
| 3 | (gm[5] − i)/(h − i) | i ≤ gm[5] ≤ h |

TABLE 6

| HP2 | gd[5] |
|---|---|
| N/14 | N/A |

In Table 6, N is the number of neighboring pixels to the current pixel in the 3×5 gradient direction matrix 22 that have a gd≠0 and not equal to gd[5]. Thus, for each neighboring pixel of the current pixel and which neighboring pixel has a gradient direction that is non-zero and is not the same as gd[5]; i.e., gradient direction is changing rapidly in this region, there is added 1/14 points and HP2 equals the sum of these points.

The MFDO fuzzy data probability valuations for halftone membership content are determined in blocks 50, 52 respectively.

The respective probability valuations for text, continuous tone and halftone are respectively summed by adders 35, 45 and 55. Thus, a text possible value TP is calculated according to TP=TP1+TP2. A contone possible value is calculated as CP=CP1+CP2 and a halftone possible value is calculated as HP=HP1+HP2. These respective possible values are input to a preliminary rule base evaluation block 60. Block 60 operates to examine the respective inputs and generate a numerical assignment value that represents the most likely type of assignment to the current pixel; i.e., is it most likely test, halftone or contone origin. With reference to Table 7, there is shown the criteria used in determining the numerical assignments.

TABLE 7

| Test Condition Weighting Order Assignment (1 is highest) | Membership Function | Criteria Investigated | Preliminary Numerical |
|---|---|---|---|
| 3 | Text | TP > HP and TP > CP | 0 |
| 1 | Contone | CP > TP and CP > (HP + 0.25) | 1 |
| 2 | Halftone | HP > (CP + 0.25) and HP > TP | 2 |
| 4 | Indeterminate | none of the above applies | 3 |

In the preliminary rule base evaluation block 60, the fuzzy data values of probabilities TP, HP and CP are compared in accordance with the noted criteria to provide a preliminary numerical assignment that is indicative of a preliminary assessment or suggestion of membership function; i.e., text is represented by 0, contone by 1 and halftone by 2. In those examples, where one probability is to exceed another's by the amount 0.25, such as CP>HP+0.25, this is merely exemplary and indicative of generally that CP>>HP, or CP is much larger than HP.

For those current pixels that when investigated in accordance with the above criteria and do not fall within the specific criteria conditions, these pixels are considered indeterminates cases and are assigned a value 3 to the output of the block 60. Thus, the four conditions may be represented by a two-bit signal. Other representations may also be used.

The numerical assignment outputs of block 60 are input to a buffer 70 which stores the numerical assignment of the current pixel and the numerical assignments from seven neighboring pixels on the previous line and three pixels on the current line to help further determine in the case of a current pixel receiving an "indeterminate" rating whether the current pixel belongs to text, contone or halftone. Such further determination for the current pixel may be in accordance with the criteria set forth in Table 8.

TABLE 8

| Test Condition Weighting Order (1 is highest) Assignment | Indeterminate Case | Final Numerical |
|---|---|---|
| 4 | 1. Most neighboring pixels have contone assignment. | 1 (contone) |
| 1 | 2. $n \geq j$ | 2 (halftone) |
| 2 | 3. Most neighboring pixels have text assignment but there are indeterminate pixels or contone pixels around the line direction of the current pixel and image data values along a direction perpendicular to the line direction indicates low density. | 1 (contone) |
| 3 | 4. Most neighboring pixels have text assignment. | 0 (text) |
| 5 | 5. None of the above. | 3 (indeterminate) |

In Table 8, a loadable parameter "j" which, for example, may be j=2 is compared with a number "n" of neighboring pixels stored in buffer 70 and which have numerical assignments indicating they have been determined to be a halftone pixel. The final numerical assignments from block 80 represent a decision regarding a determined rendering algorithm for the current pixel. This decision is output to a block 90 which provides rendering for the current pixel. As used herein, the term "rendering" implies assignment to the current pixel of a device dependent image data value representing density or lightness of the pixel to be rendered by the marking engine device or other display (ME 100), whether hard copy or soft copy type. For example, as noted above the input scanner inputs an image data density or lightness value for each pixel as represented by an 8-bits per pixel signal whereas the rendering block may be circuitry or software for converting the 8-bits per pixel signal to a 4-bits per pixel rendered pixel.

In rendering each pixel, the rendering block 90 has inputs for receiving a signal of the input image density of the current pixel which value is stored in buffer 24 and input to block 90 after a delay (92) and a signal representing a final numerical assignment from block 80. In response to these signals and signals such as clock and other control signals from front end controller 15 which is connected to the various elements in the front end portion of the apparatus and may be microprocessor-based, the rendering block 90 adjusts rendering for the current pixel based on these inputs. Thus, consider a current pixel selected for rendering as contone. A preferred rendering algorithm for contone reproduction by electrophotographic marking engine 100 may be provided using a 161 lines/inch mixed dot screen and a tone reproduction curve characteristic more suited for pictures and low granularity. Examples of such contone screens are well known. The electrophotographic marking engine may include, for example, a laser or a 600 dpi LED gray level printhead or other display device.

A current pixel indicated to be text may be processed using an algorithm more suited for text which could be error diffusion and a tone reproduction curve suited for text or a relatively high screen frequency (300 lines/inch partial dot screen.) The terms "partial dot" and "mixed dot" refer to growth patterns for screen creation using gray level pixels and are described in my U.S. Pat. No. 5,359,431. Reference may also be had to Ng et al, Gray Level Printing Method with Embedded Non-uniformity Correction Using a Multibit LED Printhead, Imaging Science & Technology's 47th Annual Conference/ICPS 1994, pages 622–625.

A current pixel determined to be halftone is preferably rendered with a rendering algorithm chosen to reduce moiré patterns. Such pixels may also be processed with error diffusion or a 300 lines/inch partial dot screen with a tone reproduction curve suited for halftone.

For those current pixels that remain indeterminate, a rendering algorithm is provided that includes a tone reproduction curve (TRC) intermediate that of the TRC for text and contone. Thus, these indeterminate pixels when printed will mix or blend in with the other screens used for printing non-indeterminate pixels and reduce moiré and artifacts. Such rendering algorithm may include error diffusion or a high frequency screen with texture compatible with the 161 lines/inch mixed dot screen. This blending in when the fuzziness of the system cannot tell which image type to assign to the current pixel provides robustness and provides a distinct advantage in the use of fuzzy logic in an image segmentation system.

Figure 5:
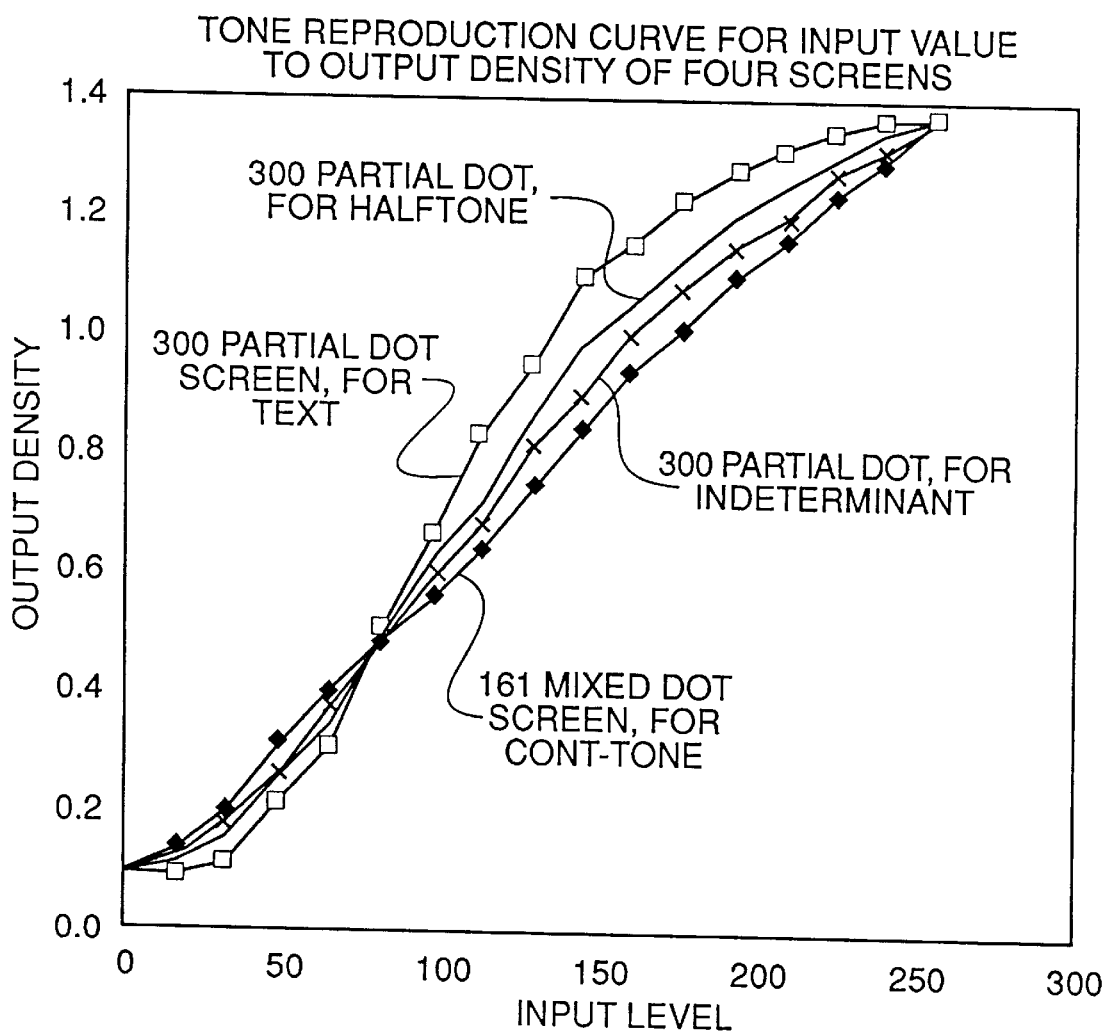
FIG. 5 illustrates a comparison example of tone reproduction curves for different image types.

In FIG. 5, there are provided tone reproduction curves illustrating possible examples of reproductions of the various image types showing output density based on input density using an electrophotographic marking engine. In FIG. 6, there is provided one example illustrating a 161 lines per inch threshold matrix featuring a mixed dot screen and useful for rendering contone in a 600 dots per inch (printer resolution) electrophotographic marking engine.

In using such a threshold pattern screen matrix, inputted pixel density values (8-bits per pixel, 0–255 decimal values) are compared with a selected threshold set of values based on pixel location so that a particular pixels gray value will be compared with one particular threshold value from each of the 15 gray levels as is well known in the art to determine the 4-bits per pixel gray level value (decimal 0–15) to render the current pixel.

Figure 7C:
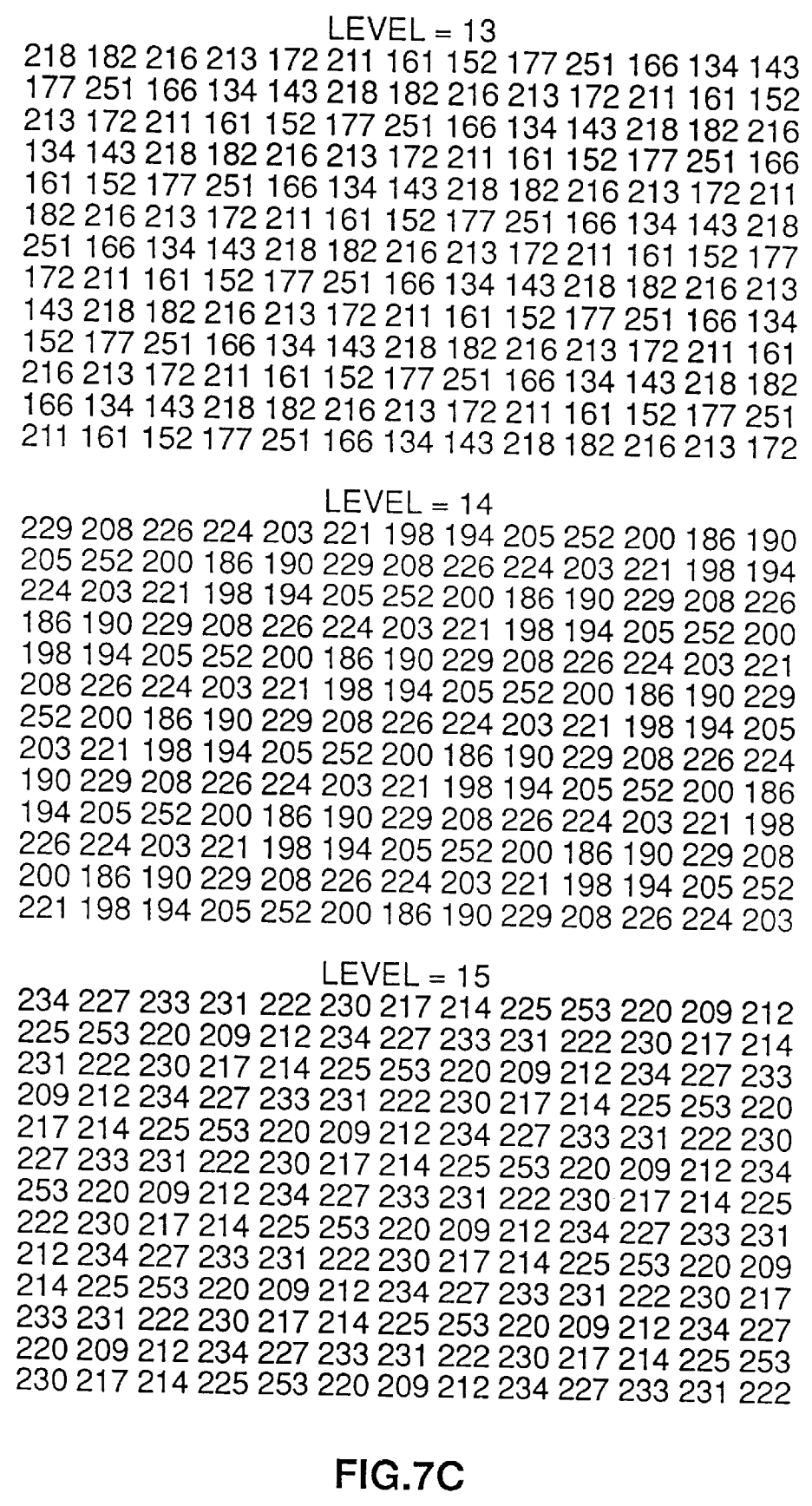

In FIGS. 7A, B and C, there is provided an example of a 300 lines per inch (4-bits per pixel) partial dot threshold screen matrix which is broadly the type preferred for rendering halftone, text and perhaps indeterminate) depending on desired contrast for each image type. However, the invention is also useful when using the same screen type for all three of these image types, particularly where the input scanning device tends to somewhat degrade the scanned image. Other alternatives, as noted above, include use of gray level error diffusion for the indeterminate case while using screen matrix thresholding for the other image types.

The system described herein provides output displays with reduced moiré for input halftones, preserves line text (including gray text) and can produce lower granularity in output displays from continuous tone inputs.

There has thus been disclosed a method and apparatus which employs fuzzy logic to provide image segmentation. For input pixels, gradient amplitudes and gradient directions are generated and used to form membership functions for the text, contone and halftone image types. The output fuzzy-data value that the membership function operation generates then becomes an input to a rule evaluator which compares the fuzzy-data values and if one rule seems to be the dominant explanation for the fuzzy-data value, the input image type will be considered to have won. This determination is then passed on to a defuzzifier and selects a predominant output rendering method as its output. In order to make the printing decision more robust towards minimizing the effects of decision error, some other intermediate rendering or processing algorithms (like those that have an intermediate tone-reproduction curve, texture and screening) can be used in cases that are too close to call. These processing algorithms will have a tendency to provide an image with minimal moire artifacts. Due to this fuzziness existing at a per pixel basis one can break up some boundary condition caused by hard-switching between image type determinations.

Figure 3:
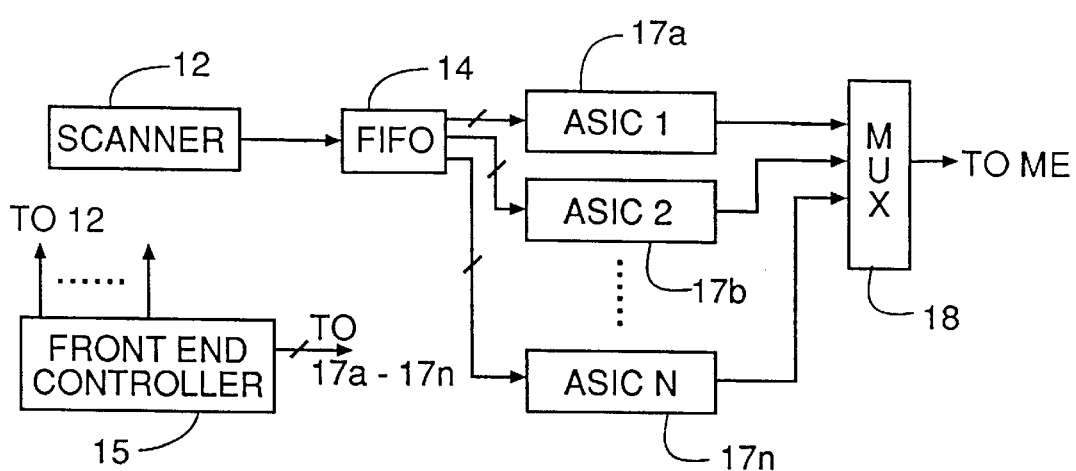
FIG. 3 is a block diagram illustrating a pipelined processing system in accordance with one aspect of the invention.

The invention may be realized using dedicated logic devices incorporated within an application specific integrated circuit (ASIC), e.g,. the logic blocks may be implemented by one ASIC 17 as indicated in FIG. 1 or by one or more circuits including circuits that have a microcomputer or other computer operation. With reference to FIG. 3, the output of the scanner 12 may have a line of data such as a raster scan line divided into plural segments and these segments operated on simultaneously by separate identical processors 17a, 17b . . . 17n to that shown as ASIC 17 in FIG. 1. Thus, with n=4 processors, a raster scan line of 8640 pixels may be divided so that each processor $17_1$–$17_4$ processes about one-fourth of the pixels with overlap provided of adjacent pixels being provided for use in calculations of pixels adjacent to the dividing points of the processors. A description of pipeline processing is provided in the aforementioned U.S. application Ser. No.08/706,953. This pipeline approach may be expanded to additional similar processors to speed the processing of data to the marking engine. Typically, the marking engine will include a page buffer or a job-image buffer member to which the processed rendered data may be output via, for example, a multiplexer 18.

The invention has been described in detail with particular reference to a preferred embodiment thereof, but it will be understood that variations and modifications can be effected within the spirit and scope of the invention.

What is claimed is:

1. A method for processing image information on a pixel by pixel basis for identifying an image type of a current pixel for rendering the current pixel in accordance with a rendering operation suited for the identified type, the method comprising:

generating on a pixel by pixel basis for each of plural image types a signal representing a probability related value that the current pixel is of that image type;

based on probability related values, determining the image type of the current pixel; and rendering the current pixel in accordance with rendering for one image type based on a likelihood that the current pixel is more characteristic of the one image type.

2. The method of claim 1 wherein a current pixel is determined after a preliminary evaluation to be indeterminate relative to assignment to an image type, and providing an evaluation for the indeterminate current pixel in accordance with criteria for assigning said indeterminate current pixel to an assignable image type.

3. The method of claim 2 wherein an indeterminate current pixel is in accordance with said criteria not assignable to an image type and is processed as an indeterminate pixel, and rendering said indeterminate pixel using a tone reproduction curve intermediate that of text and contone.

4. The method of claim 3 wherein probability of image type is determined by criteria of gradient magnitude and gradient direction.

5. The method of claim 4 wherein probability of image type is determined for each image type with a separate probability related value for gradient magnitude and a separate probability related value for gradient direction.

6. The method of claim 1 wherein probability of image type is determined by criteria of gradient magnitude and gradient direction.

7. The method of claim 6 wherein probability of image type is determined for each image type with a separate probability related value for gradient magnitude and a separate probability related value for gradient direction.

8. The method of claim 7 wherein assignable image types are contone, text, and halftone.

9. The method of claim 8 and wherein the current pixel is rendered as a gray level pixel.

10. The method of claim 2 wherein assignable image types are contone, text, and halftone.

11. The method of claim 1 wherein assignable image types are contone, text, and halftone.

12. The method of claim 11 and wherein the current pixel is rendered as a gray level pixel.

13. The method of claim 1 and wherein the signal representing a probablility related value is generated in response to simultaneous logic decisions being made with different weights being associated with the logic decisions.

14. The method of claim 1 and wherein a line segment is divided into plural subsegments and the subsegments are operated upon simultaneously for generating probability related values for plural current pixels.

15. The method of claim 2 wherein an indeterminate current pixel is in accordance with said criteria not assignable to an image type and is processed as an indeterminate pixel, and rendering said indeterminate pixel using a reproduction process that provides an image with minimal moire artifacts.

16. A method for processing image information for identifying an image type of a current pixel for rendering the current pixel in accordance with a rendering operation suited for the identified type, the method comprising:

examining at least some current pixels in an image on a pixel by pixel basis in accordance with first predetermined criteria and generating first signals representing preliminary evaluations that the image type for rendering each of said pixels is indeterminate relative to assignment of each to one of plural respective image types;

providing an evaluation for an indeterminate current pixel in accordance with second predetermined criteria and generating a second signal representing assignment of the indeterminate current pixel to one of the plural respective image types; and rendering the current pixel in accordance with the selected image type.

17. The method of claim 16 wherein an indeterminate current pixel is in accordance with said second criteria not assignable to an image type and is processed as an indeterminate pixel, and rendering said indeterminate pixel using a tone reproduction curve intermediate that of text and contone.

18. The method of claim 16 and wherein the first predetermined criteria includes examining probabilities of a current pixel being each of plural different image types.

19. The method of claim 18 wherein probability of image type is determined by criteria of gradient magnitude and gradient direction.

20. The method of claim 16 wherein an indeterminate current pixel is in accordance with said second criteria not assignable to an image type and is processed as an indeterminate pixel, and rendering said indeterminate pixel using a reproduction process that provides an image with minimal artifacts.

21. An apparatus for processing image information for identifying an image type of a current pixel for rendering the current pixel in accordance with a rendering operation suited for the identified type, the apparatus comprising:

means for generating for each of plural image types a signal representing a probability related value that the current pixel is of that image type;

means responsive to signals representing probability related values for determining the image type of the current pixel on a pixel by pixel basis; and means for rendering the current pixel in accordance with rendering for one image type based on a likelihood that the current pixel is more characteristic of the one image type.

22. The apparatus of claim 21 and including means for providing a preliminary evaluation that a current pixel is determined to be indeterminate relative to assignment to an image type, and means for providing an evaluation for the indeterminate current pixel in accordance with criteria for assigning said indeterminate current pixel to an assignable image type.

23. The apparatus of claim 22 and means for providing an evaluation that an indeterminate current pixel is in accordance with said criteria not assignable to an image type and means for processing the current pixel as an indeterminate pixel and rendering said indeterminate pixel using a tone reproduction curve intermediate that of text and contone.

24. The apparatus of claim 21 wherein probability of image type is determined by criteria of gradient magnitude and gradient direction.

* * * * *